United States Patent
Purandare et al.

(10) Patent No.: US 10,685,217 B2
(45) Date of Patent: Jun. 16, 2020

(54) EMOTIONAL CONNECTION TO MEDIA OUTPUT

(71) Applicant: International Business Machines Corporation, Armonk, NY (US)

(72) Inventors: Prasad P. Purandare, Dhankawdi (IN); Girish Padmanabhan, Pune (IN); Rajesh Patil, Pune (IN); Anand N. Deshpande, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 15/956,391

(22) Filed: Apr. 18, 2018

(65) Prior Publication Data

US 2019/0325204 A1    Oct. 24, 2019

(51) Int. Cl.
*G06K 9/00* (2006.01)
*G06F 17/11* (2006.01)
*H04H 60/33* (2008.01)

(52) U.S. Cl.
CPC .......... *G06K 9/00335* (2013.01); *G06F 17/11* (2013.01); *G06K 9/00302* (2013.01); *H04H 60/33* (2013.01)

(58) Field of Classification Search
CPC .......... G06K 9/00335; G06K 9/00302; H04H 60/33; G06F 17/11
See application file for complete search history.

(56) References Cited

U.S. PATENT DOCUMENTS

| | | | | |
|---|---|---|---|---|
| 7,707,226 B1* | 4/2010 | Tonse | ..................... | G06Q 30/02 |
| | | | | 707/796 |
| 9,769,544 B1* | 9/2017 | Pau | ......................... | H04N 21/85 |
| 2005/0244798 A1* | 11/2005 | Zernzach | ............... | G09B 23/28 |
| | | | | 434/236 |
| 2011/0256520 A1* | 10/2011 | Siefert | ..................... | G09B 5/10 |
| | | | | 434/322 |
| 2012/0117587 A1* | 5/2012 | Pedlow | .............. | H04N 21/4122 |
| | | | | 725/25 |
| 2012/0260294 A1* | 10/2012 | Reichardt | ............... | G10L 17/02 |
| | | | | 725/60 |
| 2012/0290950 A1* | 11/2012 | Rapaport | ................ | H04L 51/32 |
| | | | | 715/753 |
| 2013/0151593 A1* | 6/2013 | Shin | ........................ | H04L 67/20 |
| | | | | 709/203 |

(Continued)

FOREIGN PATENT DOCUMENTS

KR    101769829 B1    8/2017

*Primary Examiner* — Philip J Chea
*Assistant Examiner* — Wuji Chen
(74) *Attorney, Agent, or Firm* — Fabian VanCott; Steven L. Nichols

(57) ABSTRACT

A computing network may include, in an example, a plurality of media output devices communicatively coupled via the computing network; a tracking module to, when executed by a processor: track a user's emotional connection with a first media output from a first media output device of the plurality of media output devices to calculate an emotional quotient score; track the users's disconnection with the first media output from the first media output device; a connection module to connect the user to a related media output from a second media output device based on the emotional quotient score.

20 Claims, 4 Drawing Sheets

(56) References Cited

U.S. PATENT DOCUMENTS

| | | | |
|---|---|---|---|
| 2014/0258445 A1 | 9/2014 | McCoy et al. | |
| 2014/0340531 A1* | 11/2014 | Jain | H04N 5/23222 |
| | | | 348/207.1 |
| 2015/0229696 A1* | 8/2015 | Kim | H04N 21/43615 |
| | | | 709/219 |
| 2016/0065724 A1* | 3/2016 | Lee | H04M 1/72569 |
| | | | 455/556.1 |
| 2019/0073811 A1* | 3/2019 | Shah | G06K 9/00751 |

* cited by examiner

EMOTIONAL CONNECTION TO MEDIA OUTPUT

BACKGROUND

Computing networks allow for at least the added functionality of communication and exchange of data between a plurality of computing devices. Terms like the "internet of things" have been created to describe specific types of computing networks that may provide functionality that a single computing device, on its own, could not or was not designed to provide.

SUMMARY

The present specification describes a computing network. The computing network may, in an example, include a plurality of media output devices communicatively coupled via the computing network. In an example, a tracking module may be associated with the computing network to, when executed by a processor, track a user's emotional connection with a first media output from a first media output device of the plurality of media output devices to calculate an emotional quotient score. The tracking module may also, when executed by a processor, track the users's disconnection with the first media output from the first media output device. The computing network may also be associated with a connection module to, when executed by a processor, over the network connect the user to a related media output from a second media output device based on the emotional quotient score.

In an example, a network server may include a processor and a tracking module. The tracking module may, when executed by the processor: track a user's association with a first media output from a first media output device of a plurality of media output devices communicatively coupled to the network server to calculate an emotional quotient score; track the users's disconnection with the first media output from the first media output device; and a connection module to, when executed by the processor, trace and associate the user to a related media output from a second media output device based on the emotional quotient score.

In an example, a method of detecting a user's association with media output, the method may include, with a tracking module executed by a processor, tracking the user's association with a first media output from a first media output device of a plurality of media output devices to calculate an emotional quotient score. In an example, the method may also include, with a connection module executed by the processor, associating the user to a related media output from a second media output device when a disconnection with the first media output device is detected based on the emotional quotient score.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
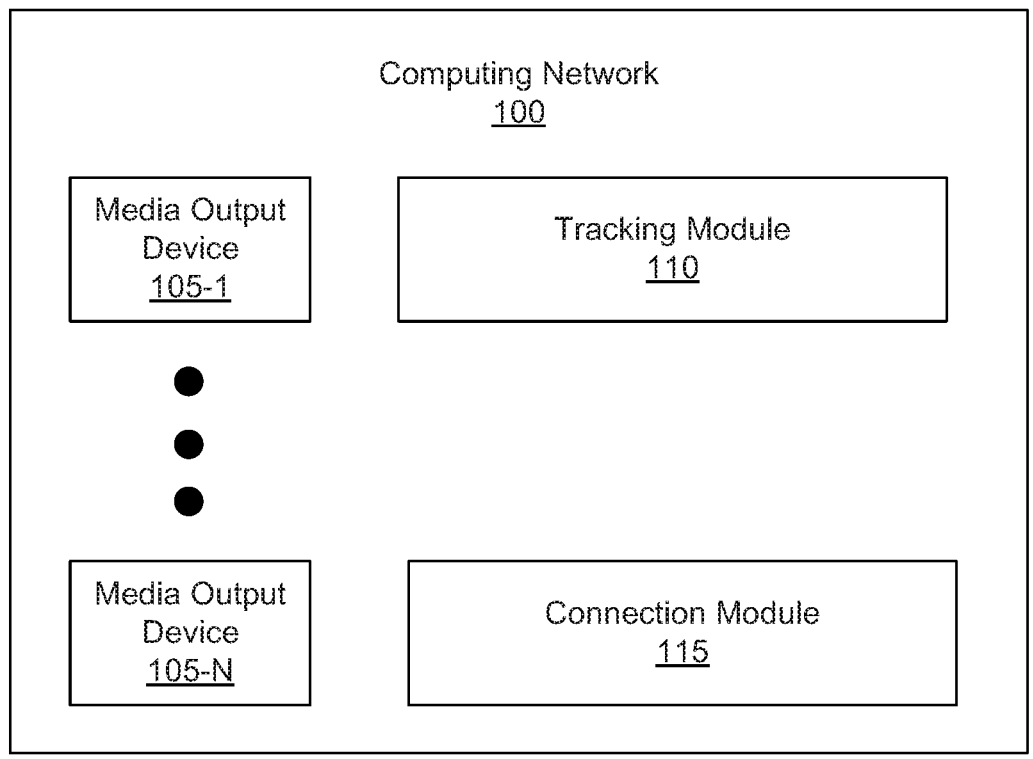
FIG. 1 is a block diagram of a computing network according to an example of the principles described herein.

Throughout the drawings, identical reference numbers designate similar, but not necessarily identical, elements. The figures are not necessarily to scale, and the size of some parts may be exaggerated to more dearly illustrate the example shown. Moreover, the drawings provide examples and/or implementations consistent with the description; however, the description is not limited to the examples and/or implementations provided in the drawings.

DETAILED DESCRIPTION

Computing networks allow data to be transferred between a plurality of computing devices regardless of the capabilities of the individual computing device within the network. The Internet of things (IoT) is an example of a computing network of physical devices, vehicles, home appliances and/or other items embedded with electronics, processors, software, sensors, actuators, and/or network connectivity which enables these physical devices to connect and exchange data. Methods of the present description may be executed in an Internet of Things network system allowing a plurality of the media output devices to provide data regarding a user's consumption of media output associated with any of the media output devices as described herein.

In some examples, even with these types of computing networks, a user may physically move away from any one of the computing devices communicatively coupled to the computing network. A user may be prompted to move away from the computing device for a number of reasons, all reasons of which prevent the user from consuming information presented to the user either visually, audibly, or via any other of the human senses. Disconnecting the user from the consumption of the information may prevent the user from having a positive experience with the device and/or information. By way of example, a user may be viewing a live sporting event on a television and may, due to other responsibilities or environmental occurrences, be pulled away from or otherwise prevented from viewing that live sporting event. As a consequence, the user may not be made aware of the results of the live sporting event reducing the user's satisfaction with that specific interaction and/or consumption of the information presented. Although the television the user was using to view the information may have been communicatively coupled, via a computing network, to other types of devices described herein, in order to continue viewing the live sporting event, the user would reconnect with the television.

Turning now to the figures, FIG. 1 is a block diagram of a computing network (100) according to an example of the principles described herein. The computing network (100) may be any type of computing network (100) that may implement any type of communication protocol between any type of media output devices (105-1, 105-N). In an example, any of the media output devices (105-1, 105-N) may include a processor or processing device to execute computer-readable program code to, at least, track a user's association with a first media output from a first media output devices (105-1) of the plurality of media output devices (105-1, 105-N) to calculate an emotional quotient score; track the users's disconnection with the first media output from the first media output device (105-1); and trace and associate the user to a related media output from a second media output device (105-N). In an example, the computing network (100) may further include a server that includes a processor or processing device to execute computer-readable program code to, at least, track a user's association with a first media output from a first media output devices (105-1) of the plurality of media output devices (105-1, 105-N) to calculate an emotional quotient score; track the users's disconnection with the first media output from the first media output device (105-1); and connect the user to a related media output from a second media output device (105-N) based on the emotion quotient score.

The media output devices (105-1, 105-N) may be any type of device that may be communicatively coupled to the computing network (100). In these examples, the media output devices (105-1, 105-N) may present any type of media or information to a user either via the network or independent of the network. By way of example, a first media output device (105-1) may be a television that, as media output, provides the user with a recorded or live broadcast that is presented to the user in the form of video, audio, or a combination thereof. In this example, the television (105-1), being communicatively coupled to the network, may provide data to a server or other types of media output devices (105-1, 105-N) communicatively coupled to the computing network (100). This data may include any type of data related to the media presented by the television device (105-1) as well as a user's association with the television (105-1) and/or its broadcast or media output. In the present specification and in the appended claims, the term "association" is meant to be understood as any connection of a user to any device. This connection may include and interaction with a media output device, a manipulation of a media output device, or a detection of a user near a media output device.

In an example, the server, the television (105-1), or any one of the media output devices (105-1, 105-N) communicatively coupled to the computing network (100) may include a tracking module (110). The tracking module (110) may include executable program code that may be executed by, for example, a processor or processing device associated with the server, television (105-1), or any of the media output devices (105-1, 105-N). The tracking module (110) may track a user's association with a first media output from a first media output device (105-1), such as the television (105-1) in this example, of the plurality of media output devices (105-1, 105-N) in order to calculate an emotional quotient score.

An emotional quotient score may be any type of score based on a user's connection to media output associated with any of the media output devices (105-1, 105-N). In the example where the user is viewing media presented by a television, the length of time the user has viewed that broadcast, the length of time the user has viewed similar types of broadcasts, how often a user views similar types of broadcasts, where the user's attention is directed as the broadcast is presented, among other viewing characteristics may be used to calculate the emotional quotient score. Generally, the duration of media consumption, the frequency of media consumption, the historic association of a media output similar to the first media output, the type of media consumption, the user's attention during the presentation of the media, a user's interaction with media output from other media output devices (105-1, 105-N), a rating a user gives to media, the time of day the user consumes the media, among other characteristics of a user interacting with any media presented by any of the media output devices (105-1, 105-N) may be used to derive the emotional quotient score. In an example, a threshold related to any of the above characteristics may be used to determine whether any of the characteristics are to be used to derive the emotional quotient score. The tracking module (110) may receive this data from any of the media output devices (105-1, 105-N) and calculate the emotional quotient score representing the user's connection with the media output presented by the television (105-1) or any other first media output device (105-1). The calculation of the emotional quotient score may include any calculation based on the users' interaction with the media output, the media output devices (105-1, 105-N), or combinations thereof. In an example, the interaction with the media output, the media output devices (1051, 105-N), or combinations thereof may be determined using a number of sensors. Thus, the tracking module (110) may further receive data from a number of sensors associated with any of the media output devices (105-1, 105-N). Some of these sensors may include motion sensors, heat sensors, eye movement sensors, noise sensors, vibration sensors, among other types of sensors that detect the user's presence around, interaction with, association with and/or consumption of media output by and/or from the media output devices (105-1, 105-N). In an example, this data obtained from the sensors may be provided to a detection module to detect the user's association, presence around, and/or interaction with any of the media output devices (105-1, 105-N). In an example, data obtained from any of these sensors may also or alternatively be consumed by the tracking module (110) to calculate the emotional quotient score as described above.

With the information received from the sensors by, for example, the detection module, the detection module, upon execution of a processor, may calculate the emotional quotient score. In an example, the emotional quotient score may be calculated by adding up a number of values associated with the input from the number of sensors. For example, a camera associated with a television may be able to recognize a facial characteristic that represents a certain emotion expressed by the user. This emotion may be registered in a database and may be compared with the user's current expression while consuming the audio and media output of the television. Where the user's expression appears to be associated with a "bored" expression, the value assigned to the input from the camera may be less than where the expression captured is excited, interested, or happy.

Input from a second sensor, such as a gaze sensor, may also be assigned a value. For example, where a user's gaze is consistently or relatively consistently directed to the video screen of the television, another value may be assigned.

Still further, input from another sensor, such as a channel sensor, may be added to the other values. In this example, the channel sensor may determine the length of time the user has viewed a certain channel, how often the user returns to the channel in a given period, and whether the viewing of any specific channel during a certain period is purposeful. In any of these examples where the channel sensor provides output, data from a gaze sensor may also be used to determine a user's emotional connection to the audio/video output from the television.

With all data received from the sensors associated with, for example, the television, the emotional quotient score may be calculated. By way of example only, the calculation may be completed by the following equation:

$$\text{Emotional Quotient Score} = IA(w) + IB(w) + IC(w) \ldots$$

where IA is input from sensor A, IB is input from sensor B, IC is input from sensor C, and w is a weight given to each of the inputs. In the present example, any number of inputs from any number of sensors may be received and added together to calculate the emotion quotient score. In this example, the higher the emotional quotient score, the more a user has an emotional connection to the output of the output device. In an example, certain inputs from certain sensors may not exceed a certain value set to be a threshold value. For example, a value associated with the length of time a certain channel on a television is viewed may reach a certain value and remain at that value. This prevents such a value from increasing the emotional quotient score arbitrarily and especially where it may be detected that the user is no longer directing a gaze towards the television. Consequently, any values associated with any of the inputs from any of the sensors may not only be weighted but may also be restrained using threshold values. In an example where a gaze sensor is used and input is received, a larger weight (w) may be assigned especially where the output of the output device includes video.

The tracking module (110) may also track the users's disconnection with the first media output from the first media output device (105-1) such as the television of the example presented herein. The sensors described herein may also provide the tracking module (110) with information regarding the user's disconnection from any of the media output devices (105-1, 105-N). As described above, the emotional quotient score calculated by the tracking module (110) may be stored on a data storage device in one or any number of the media output devices (105-1, 105-N) or servers described herein. The data storage device associated with any of the media output devices (105-1, 105-N) or computing devices on the computing network (100) may include various types of memory modules, including volatile and nonvolatile memory. For example, the data storage device of the present examples may include Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage purposes. For example, in certain examples the processors described herein may boot from Read Only Memory (ROM), maintain nonvolatile storage in the Hard Disk Drive (HDD) memory, and/or execute program code stored in Random Access Memory (RAM).

The computing network (100) may further include a connection module (115). The connection module (115) may, at least, connect the user to, at least, a related media output from a second media output device (105-N). As used in the present specification and in the appended claims, the term "related media output" is meant to be understood as media having a threshold similarity to the first media output described herein. The threshold similarity may be dependent on a number of factors relating to data associated with the first media output, data associated with a signal presented with the first media output such as a broadcasting signal, or any combination of this or similar data. By way of example, the data associated with the first media output may include a promoter of the media output, an artist associated with the media output, a broadcaster associated with the media output, the format of media the first media output is presented in (i.e., video, audio, textual, and/or tactile presentations), data associated with the topic presented in the media output, among other characteristics of the first media output.

By way of example, the first media output may be a taped or live broadcast of a sporting event on a television (105-1). In this example, the data associated with this broadcast may include the television station presenting the broadcast, the teams playing the sporting event, the time of the broadcast, the sportscasters describing the action in the sporting event, text derived from audio output during the broadcast, the format of the presentation (i.e., audio, video), among other data associated with this first media output.

The connection module (115) may then analyze this data associated with the first media output device (105-1) and then calculate a similarity between the first media output and any other potential media output on any of the media output devices (105-1, 105-N) in the computing network (100).

In an example, the connection module (115) may alternatively or additionally consider the functioning and capabilities of the of media output device. In this example, the connection module connects the user to the related media output based on the type of media device of the second media output device. By way of example, where the first media output device presented the user with both audio and video content, the connection module connects the user to a second media output device that has video and audio capabilities.

As described above, the user may be taken away or otherwise disconnected from the first media output and the tracking module (110) may determine such an occurrence. The tracking module (110) may further track a user's connection with other media output devices (105-1, 105-N) connected to the computing network (100). Alternatively, a separate module such as detection module may be continually executed in order to detect the user's presence around a second media output device and so notify one or any of the other modules described herein.

In an example, the tracking of the user's association/connection to other second media output device (105-N) may be similar to that used to track the user's association/connection with the first media output device (105-1).

When the tracking module (110) has determined that the user is now associated/connected with a second media output device (105-N), the connection module (115) may connect the user to the related media output presented by the second media output device (105-N). Again, the emotional quotient score derived by the tracking module (110) and used to track the user's emotional connection with the first media output may determine whether the user is to be connected to the related media output presented by the second media output device (105-N). By way of example, the user may have been taken away or otherwise disconnected from the sporting event broadcasted via the television (105-1) as described above. The tracking module (110) has tracked the user's disconnection from the first media output device (105-1) and the first media output presented therein (i.e., the sporting event). The connection module (115) may then be presented with the data indicating that the user has connected with the second media output device (105-N), the data associated with the first media output, and the emotional quotient score as described above. When this occurs, the connection module (115) may connect the user to the second media output device (105-N) when such indications are received, the similarity to the first media output and second media output reaches a threshold, and/or the emotional quotient score threshold indicates a connection with the related media output is to occur.

As an example, the second media output device (105-N) may be a satellite broadcasting device (105-N). In this example, one of the channels being presented on the satellite broadcasting device (105-N) may also be presenting a broadcast related to the first media output. The connection module (115) may, when executed by the processor, determine such a similarity and connect the user to the related media by automatically tuning the satellite broadcasting device (105-N) to the related media output presented on the satellite broadcasting device (105-N). In an example, this may be done regardless of the type, form, or format the second media output is presented in. For example, the first media output may be presented to the user via an audio/video output on a television (105-1) while the second media output may be presented to the user via an audio broadcast presented by the satellite broadcasting device (105-N).

Although the second media output device (i.e., the satellite broadcasting device (105-N)) does not present video, the connection module (115) may still present this second media output to the user. Indeed, the related media output (i.e., the media output broadcasted by the satellite broadcasting device (105-N)) may have a threshold level of similarity enough despite being presented in a different format. In an example, weights may be assigned to certain characteristics of the first media output and/or the second media output that to determine whether the second media output and first media output are related enough to pass a similarity threshold.

Figure 2:
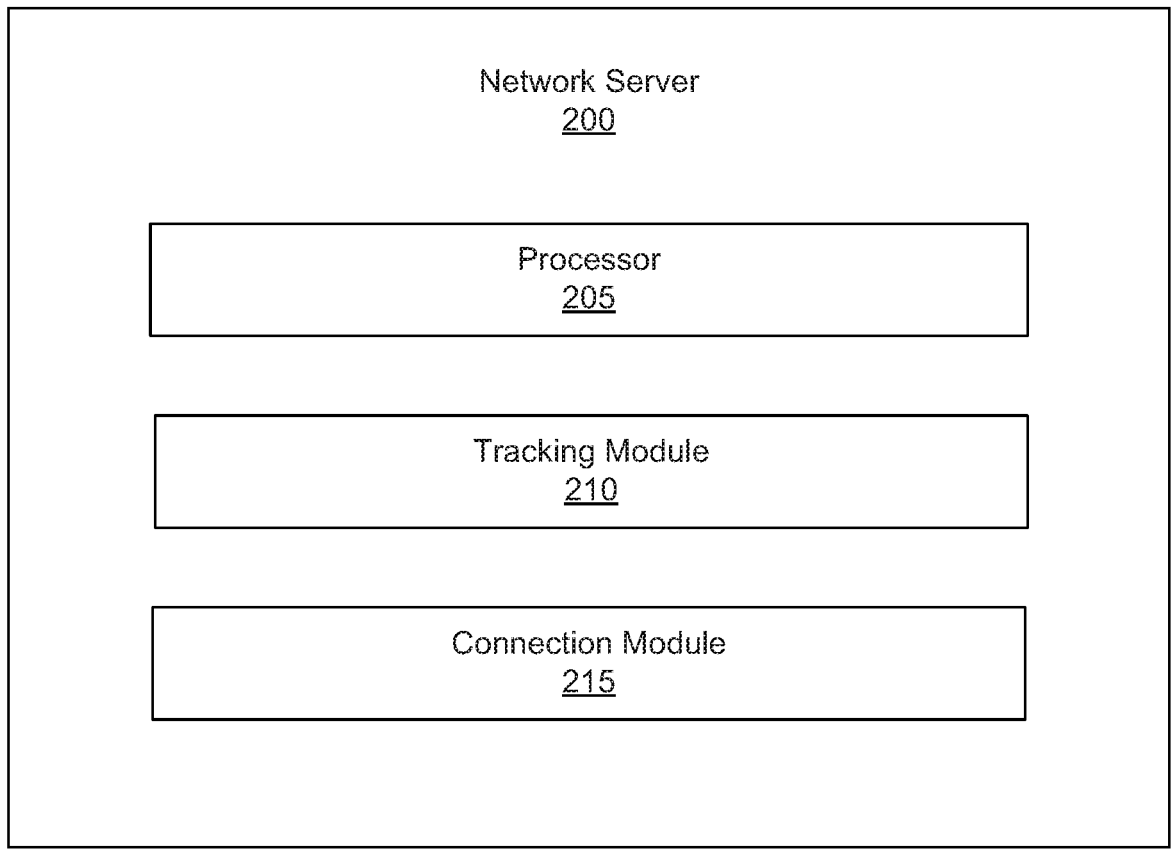
FIG. 2 is a block diagram of a network server according to an example of the principles described herein.

FIG. 2 is a block diagram of a network server (200) according to an example of the principles described herein. The network server (200) may include a processor (205) with a number of modules (210, 215): a tracking module (210) and a connection module (215). The modules (210, 215) within the network server (200) may include executable program code that may be executed separately by the processor (205). In this example, the various modules (210, 215) may be stored as separate computer program products. In another example, the various modules (210, 215) within the network server (200) may be combined within a number of computer program products; each computer program product comprising a number of the modules.

The tracking module (210), when executed by the processor (205) may cause the network server (200) to, at least, track a user's association with a first media output from a first media output device of a plurality of media output devices communicatively coupled to the network server (200) to calculate an emotional quotient score and track the users's disconnection with the first media output from the first media output device. The tracking done by the execution of the tracking module (210) may be similar to that described herein in connection with FIG. 1 and its description. In an example, the tracking module (210), when executed by the processor may receive data indicating a user's emotional connection with a first output from a first media output device. In the examples described herein, sensors may be communicatively coupled to the network server (200) and associated with a first media output device presenting the first media to the user. The sensor data associated with the first media output device communicatively coupled to the network server (200) may be received by the tracking module (210) and used, at least in part, to calculate an emotional quotient score describing the user's connection with the first media output presented by the first media output device. Other data may also be presented to the network server (200) in the form of data related to the form, type, and format of the first media output. As described herein, this data may include a promoter of the media output, an artist associated with the media output, a broadcaster associated with the media output, the format of media the first media output is presented in (i.e., video, audio, textual, and/or tactile presentations), data associated with the topic presented in the media output, among other characteristics of the first media output.

With this data, the tracking module (210) calculates an emotional quotient score describing the user's emotional connection with the first media output as well as track the users's disconnection with the first media output from the first media output device. This disconnection may include an emotional disconnection from the media, a physical disconnection from the media, or a combination thereof. An emotional disconnection may include indications from the sensors associated with the first media output device that the user is no longer interested in the first media output or has, at least, drawn attention away from the first media output. A physical disconnection may include any physical disconnection of the user from the first media output device communicatively coupled to the network server (200). Such a physical disconnection could be determined using the sensors associated with the first media output device or by any other methods to determine the physical disconnection of the user from the first media output device.

The connection module (215) may connect the user to a related media output from a second media output device based, at least, on the emotion quotient score calculated by the tracking module (210). In an example, a threshold limit may be associated with the emotional quotient score such that connection with the second media output device does not occur unless the threshold limit it reached.

As described herein, the connection module (215) may receive data regarding a user's association with a second media output device and connect that user, automatically, to a related media output that may be presented on a second media output device communicatively coupled to the network server (200). This connection may be done automatically once it is detected that a user is associated with the second output device such as being physically proximate to the second output device or detecting that the user is interacting with the second output device. Again, any number of sensors such as facial recognition may be used to determine where the user is respective to the second output device. In this example, the network server (200) may serve as an intermediary between the first and second media output devices. In an example, the network server (200) may serve as a central server in an internet-of-things topography thereby allowing multiple media output devices to communicate to each other or, at least, communicate centrally with the network server (200). In this example, the network server (200) may include any computer-readable program code that allows a user to customize the operation of any of the media output devices described herein. This customization may include providing an interface to the user allowing the user to set the similarity thresholds and weights to be applied to the characteristics of any media output from any of the media output devices.

Figure 3:
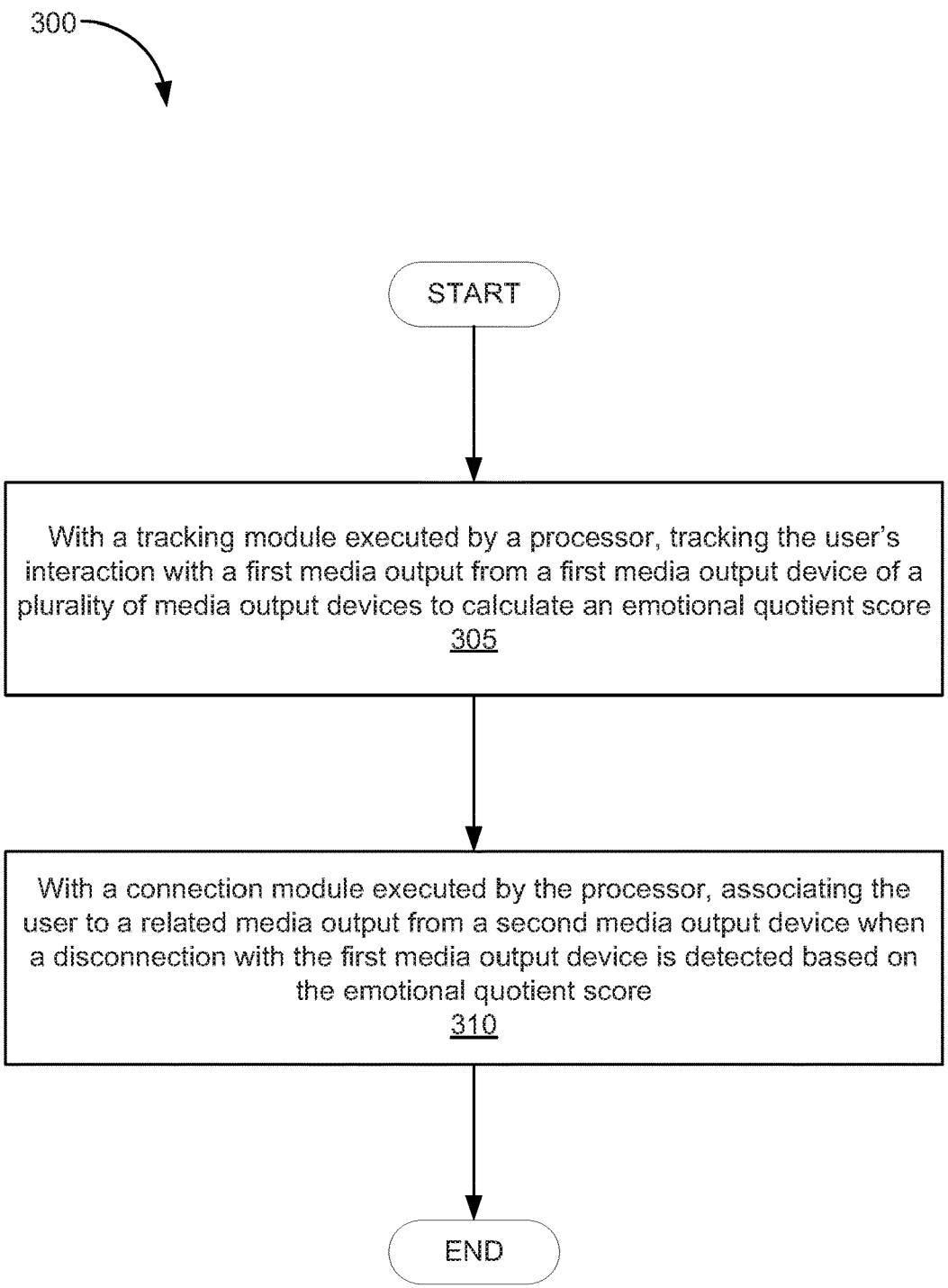
FIG. 3 is a flowchart showing a method of detecting a user's association with media output according to an example of the principles described herein.

FIG. 3 is a flowchart showing a method (300) of detecting a user's association with media output according to an example of the principles described herein. The method (300) may begin by, with a tracking module executed by a processor, tracking (305) the user's interaction with a first media output from a first media output device of a plurality of media output devices to calculate an emotional quotient score. As described herein the tracking of a user's interaction, association, or even presence around a first media output device or consumption of or association with a first media output may include receiving data from a number of sensors. For example, where a user is viewing a broadcasted or live sporting event on a television, different sensors may be used to detect the user's interaction with the broadcast. Example sensors include eye detectors to detect the user's gaze, heat sensors to detect the user's body heat and presence, voice detectors to detect the user's voice, motion sensors to detect the user's movements near the television, among other sensors. Additionally, the sensors may include the television itself which may present to the tracking module the content being displayed as well as other data associated with the first media output presented by the television. This data may include broadcast date, publisher of the broadcast, station the broadcast is broadcasted from, the duration of time the user has watched the broadcast, the number of times the view has changed the channel on the television, when the channel was changed on the television (i.e., during commercials or actual sporting event playtime), among other types of data.

The method (300) may continue by, with a connection module executed by the processor, associating (310) the user to a related media output from a second media output device when a disconnection with the first media output device is detected based on the emotional quotient score. As described above, the first media output device may be communicatively coupled to a second media output device via, for example, a server. This connection allows the data from the first media output device described herein to be shared with other media output devices in this network. As such, when a user disconnects from the first media output and it is determined that the user is around or could interact with similar media output to the first media output, the connection module may automatically play that similar media output on the second media output device. In the example of the user viewing the sporting event on a television, this may allow the user to continue to consume the sporting event from a second media output device. The user may continue to consume the sporting event on the second media output device regardless of whether the broadcaster is the same broadcaster, if the similar media output is in the same format as the first media output, or if the similar media output is in a different format as the first media output.

Figure 4:
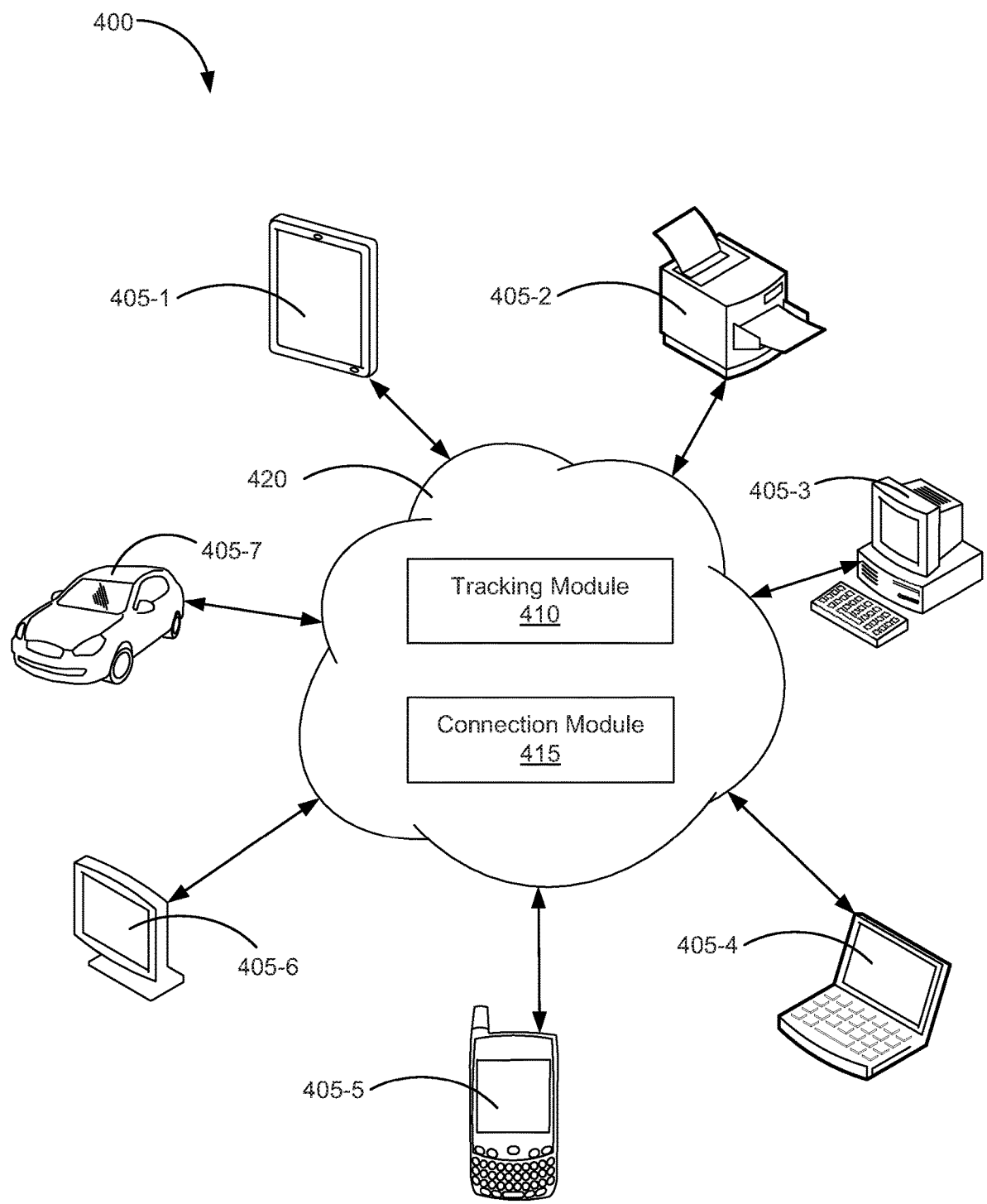
FIG. 4 is a graphical diagram of a network for detecting a user's association with media output device according to an example of the principles described herein.

FIG. 4 is a graphical diagram of a network (400) for detecting a user's association with media output device (405-1-405-7) according to an example of the principles described herein. The network (400) may include any number of media output device (405-1-405-7) communicatively coupled via the network (400). The network (400), in an example and in the example presented in FIG. 4, may be a cloud network (420).

The media output devices (405-1-405-7) may include any type of media output device including, but not limited to, a tablet device (405-1), a printing device (405-2), a desktop computing device (405-3), a laptop computing device (405-4), a smart phone (405-5), a television (405-6), and/or a vehicle (405-7) that may include an audio output device such as a FM radio, an AM radio, or a satellite radio.

As described here, any of the media output devices (405-1-405-7) or a server associated with the cloud network (420) may include one or both of the tracking module (410) or connection module (415). Again, the tracking module (410) may, at least, track a user's emotional connection with a first media output from a first media output device (405-1-405-7) of the plurality of media output device (405-1-405-7) to calculate an emotional quotient score and track the users's disconnection with the first media output from the first media output device (405-1-405-7).

By way of example, the tracking module (410) may track the user's emotion connection with a broadcast presented on a television (405-6). An emotional quotient score may be calculated by the tracking module (410) based on a number of factors including the duration of viewing by the user, data received by a number of sensors indicating the user's attention to the broadcast, among other factors described herein. Similarly, the tracking module (410) may track if and when the user disconnects from the first media output from the first media output device (405-1-405-7) either emotionally or physically.

The connection module (415) may, in an example, connect the user to a related media output from a second media output device (405-1-405-7) based on the emotional quotient score. Any media output device (405-1-405-7) or any other device associated with the network (400) may monitor a user's connection, interaction with, and/or association with any of the media output devices (405-1-405-7). When this detection occurs, the connection module (415) may connect the user to media output presentable by a second media output device (405-1-405-7) based on the emotional quotient score to the first media output as described herein.

The network server (200) and/or computing network (100) described herein may be utilized in any data processing scenario including, stand-alone hardware, mobile applications, through a computing network, or combinations thereof. Further, the network server (200) and/or computing network (100) may be used in, a public cloud network, a private cloud network, a hybrid cloud network, other forms of networks, or combinations thereof. In one example, the methods provided by the network server (200) and computing network (100) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the network server (200) and/or computing network (100) are executed by a local administrator.

To achieve its desired functionality, the network server (200) and media output devices (105-1, 105-N) may include various hardware components. Among these hardware components may be a number of processors, a number of data storage devices, a number of peripheral device adapters, and a number of network adapters. These hardware components may be interconnected through the use of a number of busses and/or network connections.

The processor may include the hardware architecture to retrieve executable code from the data storage device and execute the executable code. The executable code may, when executed by the processor, cause the processor to implement at least the functionality of tracking the user's association with a first media output from a first media output device of a plurality of media output devices to calculated an emotional quotient score and associating the user to a related media output from a second media output device when a disconnection with the first media output device is detected based on the emotional quotient score, according to the methods of the present specification described herein. In the course of executing code, the processor may receive input from and provide output to a number of the remaining hardware units.

The hardware adapters in the network server (200) and/or media output devices (105-1, 105-N) enable the processors to interface with various other hardware elements, external and internal to the network server (200) and media output devices (105-1, 105-N). For example, the peripheral device adapters may provide an interface to input/output devices, such as, for example, a display device, a mouse, or a keyboard. The peripheral device adapters may also provide access to other external devices such as an external storage device, a number of network devices such as, for example, servers, switches, and routers, client devices, other types of computing devices, and combinations thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The specification and figures describe a computing network that monitors a user's emotional connection to any specific media output presented by a media output device and reconnect that user to the same or a similar media output as the first media output in order to allow the user to continue to consume the output. The reconnection to the similar or same media output allows the user to reestablish the emotional connection to the type or content of media originally presented. This reconnection may occur regardless of the type of media output device reconnecting the user to the similar or same media output as the first media output. Additionally, this reconnection may occur regardless of the capabilities of the media output device reconnecting the user to the similar or same media output. In one example scenario, the user may be allowed to continue the consumption of a sporting event originally presented on a television by being reconnected, via the network described herein, to a radio broadcast of that sporting event.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing network, comprising:
    a plurality of media output devices communicatively coupled via the computing network;
    a tracking module to, when executed by a processor:
        track a user's emotional connection with a first media output from a first media output device of the plurality of media output devices to calculate an emotional quotient score, wherein the emotional quotient score is calculated based on input from a number of sensors arranged to detect the user's interaction with the first media, the number of sensors comprising a camera for detecting the user's facial expression and a gaze sensor to track the user's gaze, a channel sensor may determine the length of time the user has viewed a certain channel and how often the user returns to the channel in a given period; the input from different sensors being weighted different in calculating the emotional quotient score;
        track the users' s disconnection with the first media output from the first media output device;
    a connection module to connect, over the network, the user to a related media output from a second media output device of the plurality of media output devices based on the emotional quotient score.

2. The computing network of claim 1, wherein the emotional quotient score is calculated using a history of the user's association with the first media output.

3. The computing network of claim 1, wherein the emotional quotient score is calculated using a history of the user's association with similar media associated with the first media output from the first media output.

4. The computing network of claim 3, wherein the similarity of the similar media to the first media output is based on data associated with the first media output, data associated with a signal presented with the first media output, or combinations thereof.

5. The computing network of claim 1, wherein the second media output is presented to the user as a same or different format than the first media output.

6. The computing network of claim 1, further comprising a detection module to detect the user's association with the second media output device.

7. The computing network of claim 6, wherein the connection module automatically adjusts the second media output device to present the second media output when the detection module detects the user's association with the second media output device.

8. The computing network of claim 1, wherein the connection module connects the user to the related media output based on the type of media device of the second media output device.

9. A network server, comprising:
    a processor;
    a tracking module to, when executed by the processor:
        track a user's association with a first media output from a first media output device of a plurality of media output devices communicatively coupled to the network server to calculate an emotional quotient score, wherein the emotional quotient score is calculated based on input from a number of sensors arranged to detect the user's interaction with the first media, the number of sensors comprising a camera for detecting the user's facial expression and a gaze sensor to track the user's gaze, a channel sensor may determine the length of time the user has viewed a certain channel and how often the user returns to the channel in a given period; the input from different sensors being weighted different in calculating the emotional quotient score;
        track the users' s disconnection with the first media output from the first media output device; and
    a connection module to, when executed by the processor, associate the user to a related media output from a second media output device of the plurality of media output devices based on the emotional quotient score.

10. The network server of claim 9, wherein the emotional quotient score is calculated using a history of the user's association of the first media output.

11. The network server of claim 9, wherein the emotional quotient score is calculated using a history of the user's association with the related media related to the first media output.

12. The network server of claim 11, wherein the similarity of the similar media to the first media output is based on data associated with the first media output, data associated with the signal presented with the first media output, or combinations thereof.

13. The network server of claim 9, wherein the second media output is presented to the user as a same or different format than the first media output.

14. The network server of claim 9, further comprising a detection module to, when executed by the processor, detect the user's association with the second media output device.

15. The network server of claim 9, further comprising a detection module to, when executed by the processor, detect the user's presence around the second media output device.

16. The network server of claim 9, wherein the connection module connects the user to the related media output based on the type of media device of the second media output device.

17. A method of detecting a user's association with media output, the method comprising:

with a tracking module executed by a processor, tracking the user's association with a first media output from a first media output device of a plurality of media output devices to calculate an emotional quotient score, wherein the emotional quotient score is calculated based on input from a number of sensors arranged to detect the user's interaction with the first media, the number of sensors comprising a camera for detecting the user's facial expression and a gaze sensor to track the user's gaze, a channel sensor may determine the length of time the user has viewed a certain channel and how often the user returns to the channel in a given period; the input from different sensors being weighted different in calculating the emotional quotient score;

with a connection module executed by the processor, associating the user to a related media output from a second media output device of the plurality of media output devices when a disconnection with the first media output device is detected based on the emotional quotient score.

18. The method of claim 17, wherein the emotional quotient score is calculated using a history of the user's association of the first media output, a history of the user's association of similar media similar to the first media output, or combinations thereof.

19. The method of claim 18, wherein the similarity of the similar media to the first media output is based on data associated with the first media output, data associated with the signal presented with the first media output, or combinations thereof.

20. The method of claim 17, further comprising detecting, with a detection module executed by a processor, detect the user's interaction with the second media output device, detect the user's presence around the second media output device, or combinations thereof.

* * * * *